April 7, 1970  W. B. BANKS  3,504,526
VIBRATION ISOLATION MOUNTING MEANS FOR
A VIBRATORY MEASURING DEVICE
Filed May 19, 1967

William B. Banks
INVENTOR

BY
ATTORNEYS

United States Patent Office
3,504,526
Patented Apr. 7, 1970

3,504,526
VIBRATION ISOLATION MOUNTING MEANS FOR A VIBRATORY MEASURING DEVICE
William B. Banks, Houston, Tex., assignor to Automation Products, Inc., Houston, Tex., a corporation of Texas
Filed May 19, 1967, Ser. No. 639,800
Int. Cl. G01n 29/02
U.S. Cl. 73—32                4 Claims

ABSTRACT OF THE DISCLOSURE

An elongate tubular mounting pedestal for isolating a vibratory hollow body measuring device from external vibrations and supporting the vibratory measuring device in a position perpendicular to the direction of vibration of the measuring device and having a low natural resonant frequency in a torsional direction compared to the frequency of vibration of the measuring device by providing a generally longitudinally extending first slot and a second slot extending generally transversely from the first slot thereby having a low transmissibility.

BACKGROUND OF THE INVENTION

The present invention relates to a mounting means or pedestal for supplying sufficient rigidity to support a vibratory hollow body measuring device such as a density meter, but which is provided with a vibration transmissibility such that interfering external vibrations are prevented from interfering with the measuring device. In particular, the present invention relates to providing a mounting pedestal for supporting a vibratory measuring device including an elongate tubular member positioned perpendicular to the direction of vibration of the measuring device which supplies a sufficient strength to rigidly support the measuring device in the perpendicular direction, but allows sufficient torsional flexibility by providing a first longitudinally extending slot and at least one other slot extending generally transversely from the first slot to isolate the measuring device from external vibrations.

In general, vibratory mass presence sensing device such as disclosed in my copending Patent No. 3,339,400, discloses one type of vibratory mass presence apparatus for measuring physical properties of materials such as density, weight, specific gravity and measurement of material level in which it is desirable to provide a supporting structure which has a natural resonant frequency different from the resonant frequency of the vibration means so as to isolate the measuring device from external vibrations which would affect the accuracy of the measuring instrument. The present invention provides a specific mounting means which is sturdy enough to support the measuring device, but which has a low level of transmissibility so as to block out external interfering signals.

SUMMARY

The present invention is directed to providing a mounting means or pedestal for supporting a vibratory material measuring apparatus which includes an elongate member preferably tubular, positioned perpendicular to the direction of vibration of the measuring device and which includes a longitudinal first slot and at least one second slot extending generally transversely from the first slot to provide a sufficient torsional flexibility between the two ends of the elongate member to provide a low natural resonant frequency compared to the frequency of operation of the measuring device thereby having a low transmissibility and isolating the measuring device from external interfering vibrations.

Therefore, it is a general object of the present invention to provide a mounting means or a pedestal for supporting a vibratory material sensing apparatus and isolating the sensing apparatus from external vibrations.

Still a further object of the present invention is the provision of an elongate tubular member having first and second ends, one of which is connected to and supporting a vibratory mass presence sensing apparatus to provide a stable and rigid support in a longitudinal direction which is perpendicular to the direction of vibration of the sensing device, but allowing a sufficient torsional flexibility by providing a longitudinal slot in the mounting member having second and third slots extending transversely from the first slot and extending oppositely from each other and spaced from each other to provide a low vibration transmissibility.

BRIEF DESCRIPTION OF THE DRAWINGS

In the attached drawing, like character references designate like parts throughout the several views in which.

DESCRIPTION OF THE PREFERRED EMBODIMENT

Figure 1:
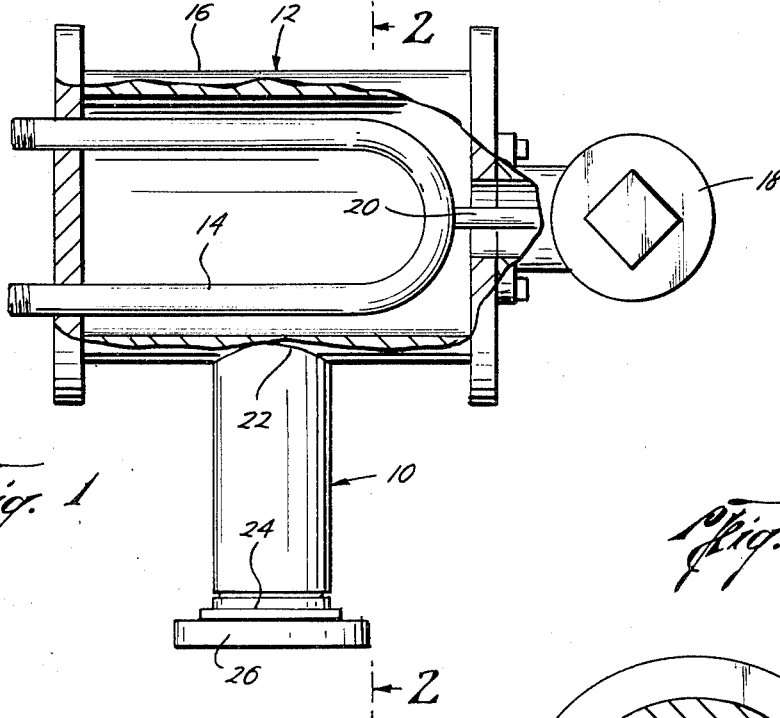
FIGURE 1 is an elevational view, partly in cross-section, illustrating the present invention supporting one type of vibratory sensing apparatus.
Figure 2:
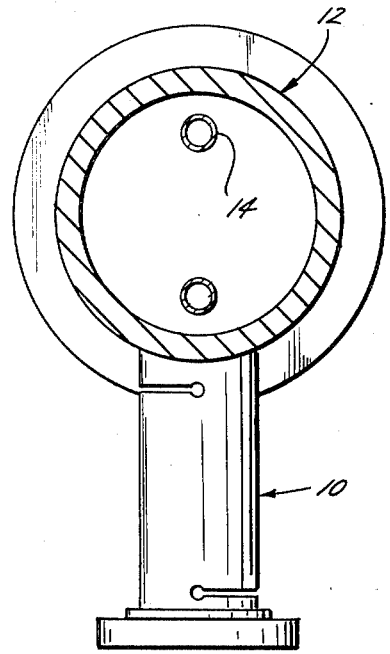
FIGURE 2 is a cross-sectional view taken on the line 2—2 of FIGURE 1.

Referring now to the drawings, and particularly to FIGURES 1 and 2, the mounting means or mounting pedestal of the present invention is generally indicated by the reference numeral 10 and is shown supporting one type of vibratory sensing apparatus generally indicated by the reference numeral 12. While the vibratory sensing apparatus 12 may be any suitable apparatus, the type shown herein includes a U-shaped hollow body 14 for conducting flowing material therein and measuring various physical properties thereof such as density, weight, specific gravity and material level and in which support means 16 are provided for supporting the body 14 adjacent the node points of the natural resonant frequency of the body, and a vibration means (not shown) and vibration detection means (not shown) in a housing 18, both of which are connected to the body 14 through a rod 20. Thus, the U-shaped body 14 and the material therein which is to be measured is vibrated, in this case in a direction perpendicular to a plane through the two legs of the U-shaped body 14, and the amplitude of vibration of the body 14 is measured which is an indication of the value or change in the value of the physical property of the mass of the material being measured. No further description of the particular mass presence sensing apparatus 12 is necessary as such device is more fully described in my Patent No. 3,177,705, and my copending patents Nos. 3,339,400 and 3,320,791.

However, it is obvious that since the U-shaped body 14 is vibrated and the amplitude of vibration is measured as an indication of the physical property of the material flowing through the body 14, extraneous vibrations or impacts having a frequency close to the operating frequency of the apparatus 12 will interfere with the accuracy of the measurement of the apparatus 12. In particular, since 60-cycle is a common supply frequency, the apparatus 12 is frequently operated from such supply and consequently is also subject to interfering vibrations from adjacent 60-cycle operating machinery.

Figure 3:
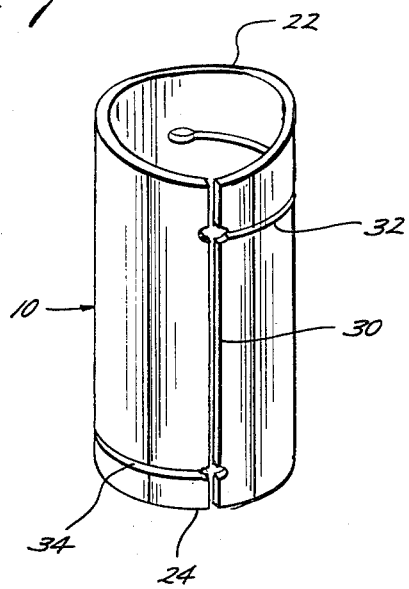
FIGURE 3 is an enlarged isometric view of the preferred embodiment of the mounting means or pedestal of the present invention.

Referring now to FIGURES 1, 2 and 3, mounting means or pedestal 10 includes a first end 22 and a second end 24 one of which is connected to the support means 16 such as by welding, and supports the apparatus 12 and the second end 24 may suitably be attached and fixedly mounted such as through a flange 26. While the pedestal 10 is here shown as mounted in a vertical position, it can of course, be equally mounted in other positions. The mounting means 10 is an elongate hollow member, preferably tubular. However, it is to be noted that the longitudinal axis of the pedestal 10 is perpendicular, as best seen in FIGURES 1 and 2, to the direction in which the U-shaped body 14 is vibrated. Since the longitudinal axis of the mounting pedestal 10 is perpendicular to the direction of vibration of the U-shaped body 14, longitudinal vibrations through the pedestal 10 will be directed against the entire sensing apparatus 12 in a direction which will not have any substantial effect on the accuracy of the apparatus 12, and therefore the mounting 10 may be made relatively stable and rigid for suitably supporting the apparatus 12 without any substantial concern as to the natural resonant frequency of the mounting means and thus of its vibrational transmissibility in a longitudinal direction.

However, the transmissibility of vibration signals equals $$\frac{1}{1 - \left(\frac{f_{op}}{f_n}\right)^2}$$

where $f_{op}$ is the frequency of operation and $f_n$ is the natural resonant frequency.

Therefore, it is necessary to provide the mounting pedestal 10 with a natural resonant frequency, in a torsional direction and thus in the direction in which the U-shaped body 14 is vibrated, that is considerably lower than the operational vibration frequency of the apparatus 12 to isolate the apparatus 12 from external vibrations. For example only, assuming that the operational frequency vibration of the apparatus 12 is 120 cycles per second, if the natural resonant frequency in a torsional direction of the mounting 10 is 5 cycles per second, then the transmissibility of vibration signals through the pedestal 10 to the apparatus 12 would be $$\frac{1}{1 - \left(\frac{120}{5}\right)^2} = .0017$$

which would be such a low transmissibility that the apparatus 12 from a practical standpoint would not be affected by external vibrations in a transverse direction even if the external vibrations were at the operational frequency of 120 cycles per second.

Therefore, in order to provide the pedestal 10 with a low natural resonant frequency and thus a low transmissibility, sufficient torsional flexibility is provided by providing a substantial longitudinal extending first slot 30 and at least one other slot 32 extending generally transversely from the first slot 30. Thus, the first and second ends 22 and 24 of the pedestal 10 are provided with a greater torsional flexibility relative to each other and will provide a lower natural resonant frequency of the pedestal 10 in a torsional direction. Preferably, greater torsional flexibility and a lower natural resonant frequency is provided by providing additional slots extending generally transversely from the first slot 30 such as slot 34 which extends in an opposite direction from slot 32 which factor also increases the torsional flexibility of the pedestal 10. Of course, the length of the transversely extending slots 32 and 34 affect the torsional natural resonant frequency of the mounting 10 in which the natural resonant frequency decreases as the length of the slots 32 and 34 increase.

In operation, the mounting pedestal 10 can be connected to any vibratory sensing apparatus, such as 12 and to a fixed support such as through a flange 26 and when positioned perpendicular to the direction of vibration of the apparatus 12 will provide a rigid and sturdy support in which longitudinal vibrations, since they are perpendicular to the direction of vibration, will not unduly affect the sensitivity of the measurement instrument 12. Since the torsional flexibility of the mounting pedestal 10 in the direction in which the apparatus 12 is vibrated has a low natural resonant frequency as compared to the operational frequency of the apparatus 12, external vibrations will be effectively isolated from interfering with the sensitivity of the apparatus 12.

The present invention, therefore, is well adapted to carry out the objects and attain the ends and advantages mentioned as well as others inherent therein. While a presently preferred embodiment is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In a mass presence sensing apparatus for flowing materials having a U-shaped hollow body for conducting the material, support means supporting the legs of the body adjacent the node points of the natural resonant frequency of the body, vibration means connected to the body for vibrating the body at predetermined operational frequencies, and vibration detection means connected to the body for detecting a change in the vibration of the body on a change in the mass of the material flowing in the body, the improvement in a mounting means connected to the support means comprising, an elongate hollow member, said member being positioned perpendicular to the direction of vibration of the U-shaped hollow body, said member having a generally longitudinal extending first slot and a second slot extending generally transversely from the first slot for increasing the torsional flexibility of said member to provide said member with a low natural resonant frequency in said torsional direction about its longitudinal axis as compared to the predetermined frequency of vibration of the sensing apparatus thereby isolating said apparatus from external vibrations in the direction of vibration of said body.

2. In a mass presence sensing apparatus for flowing materials having a U-shaped hollow body for conducting the material, support means supporting the legs of the body adjacent the node points of the natural resonant frequency of the body, vibration means connected to the body for vibrating the body perpendicular to a plane through both legs at predetermined operational frequencies, and vibration detecting means connected to the body for detecting a change in the vibration of the body on a change in the mass of the material flowing in the body, the improvement in a mounting means connected to and supporting said supporting means comprising, a tubular member having first and second ends, one of which is connected to the end supporting the supporting means, said member being positioned perpendicular to the direction of vibration of the U-shaped hollow body, said member having a generally longitudinal extending first slot and second and third slots extending generally transversely from the first slot, said second and third slots extending oppositely from each other from the first slot and spaced from each other for increasing the torsional flexibility of said member to provide said member with a low natural resonant frequency in said torsional direction about its longitudinal axis as compared to the predetermined operational frequencies of vibration of the body thereby isolating said sensing apparatus from external vibrations in the direction of vibration of said body.

3. In combination with a density measuring apparatus for flowing materials having a hollow body for conducting the material, support means for supporting the body for vibration, vibration means connected to the body for vibrating the body in a first direction at predetermined operational frequencies, vibration detection means connected to the body for detecting a change in the vibration of the body, and a mounting means connected to the support means comprising, an elongate tubular member,
the longitudinal axis of said member positioned perpendicularly to the direction of vibration of the body,
said member having a low natural resonant frequency in a torsional direction about its longitudinal axis as compared to the predetermined operational frequencies of the measuring apparatus thereby isolating said measuring apparatus from external vibrations in the direction of vibration of said device.

4. In combination with a density measuring apparatus for flowing materials having a hollow body for conducting the material, support means for supporting the body for vibration, vibration means connected to the body for vibrating the body in a first direction at predetermined operational frequencies, vibration detection means connected to the body for detecting a change in the vibration of the body, and a mounting means connected to the support means comprising, an elongate tubular member,
the longitudinal axis of said member positioned perpendicularly to the direction of vibration of the body, said member having a generally longitudinal extending first slot and a second slot extending generally transversely from the first slot for increasing the torsional flexibility of said member to provide said member with a low natural resonant frequency in said torsional direction about its longitudinal axis as compared to the predetermined operational frequencies of vibration of the body thereby isolating said measuring apparatus from external vibrations in the direction of vibration of said body.

References Cited

UNITED STATES PATENTS

| | | | |
|---|---|---|---|
| 2,432,050 | 12/1947 | Thiry | 248—358 |
| 2,519,702 | 8/1950 | Robinson | 248—358 |
| 2,639,115 | 5/1953 | Iredell | 248—358 |
| 3,106,847 | 10/1963 | Mullins et al. | 73—505 |
| 3,385,104 | 5/1968 | Banks | 73—67.2 |

CHARLES A. RUEHL, Primary Examiner

U.S. Cl. X.R.

73—67; 248—358